Oct. 7, 1969  D. J. LEVINSON  3,470,812
COFFEE BREWING HEAD
Filed March 18, 1968  5 Sheets-Sheet 1
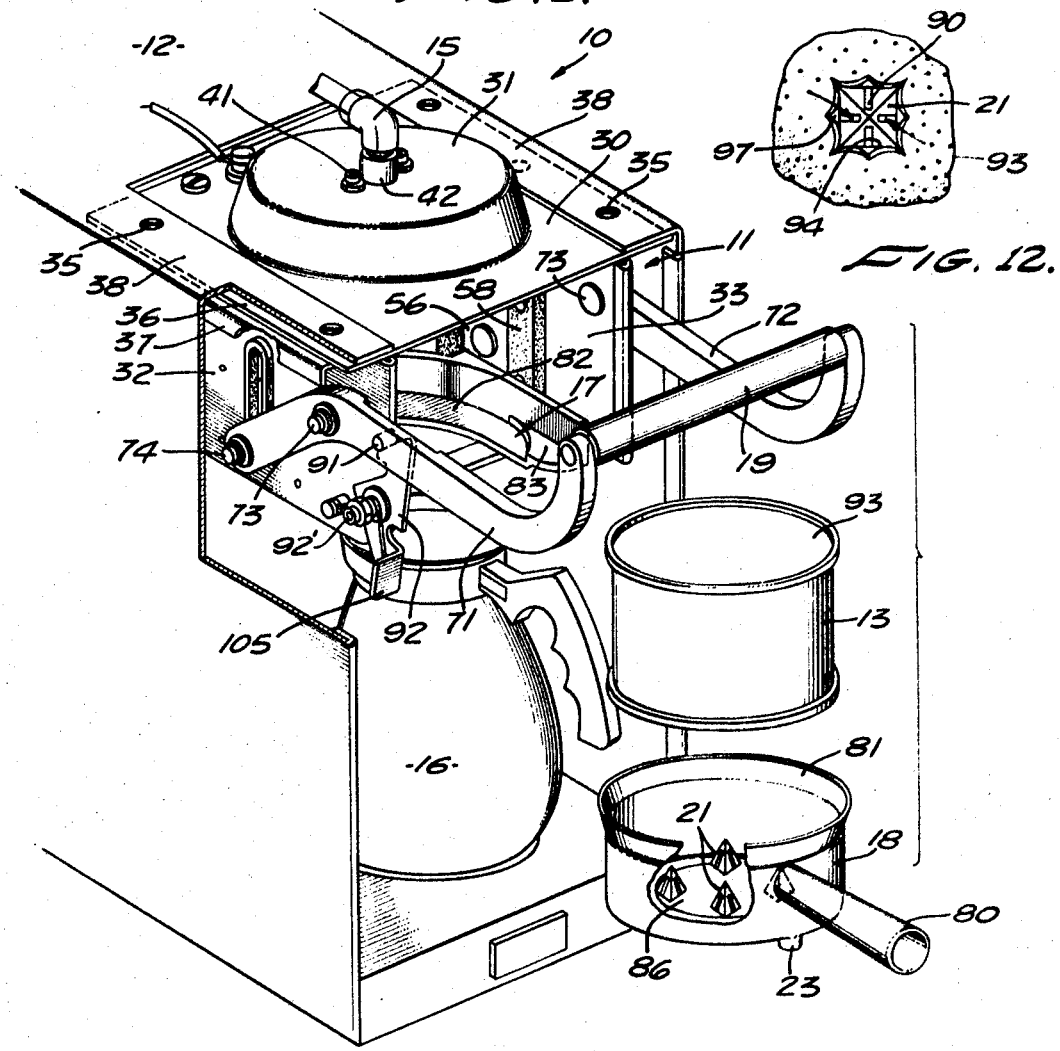
Fig. 1.
Fig. 12.
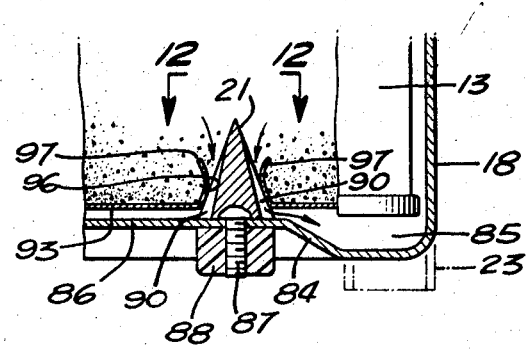
Fig. 11.
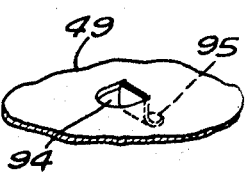
Fig. 10.
INVENTOR.
DAVID J. LEVINSON
BY Beehler & Arant
ATTORNEYS Oct. 7, 1969 D. J. LEVINSON 3,470,812
COFFEE BREWING HEAD
Filed March 18, 1968 5 Sheets-Sheet 2
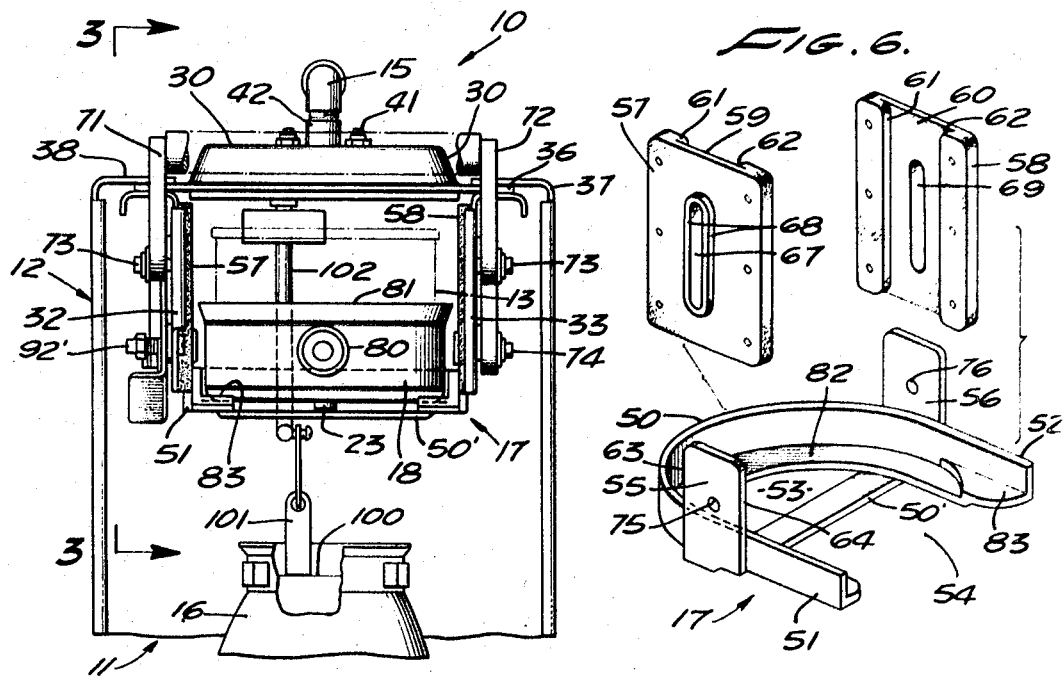
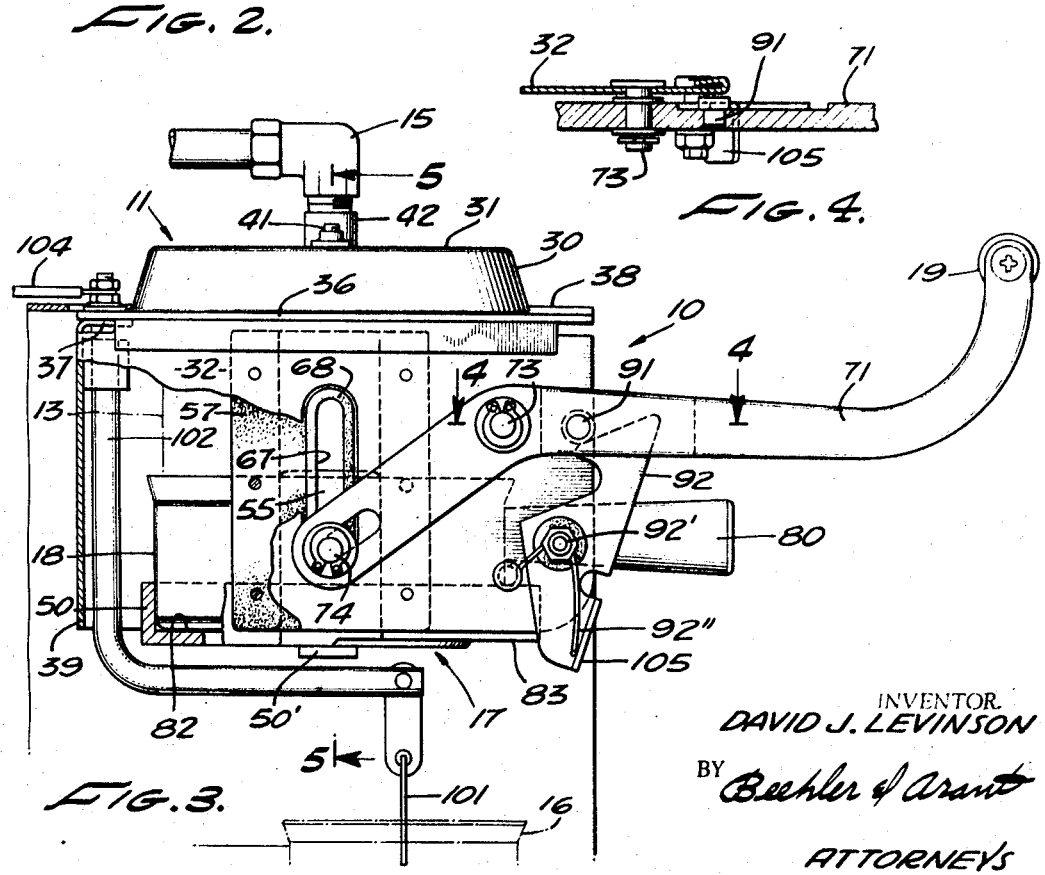
INVENTOR.
DAVID J. LEVINSON
BY Beehler & Arant
ATTORNEYS Oct. 7, 1969     D. J. LEVINSON     3,470,812
COFFEE BREWING HEAD
Filed March 18, 1968     5 Sheets-Sheet 3
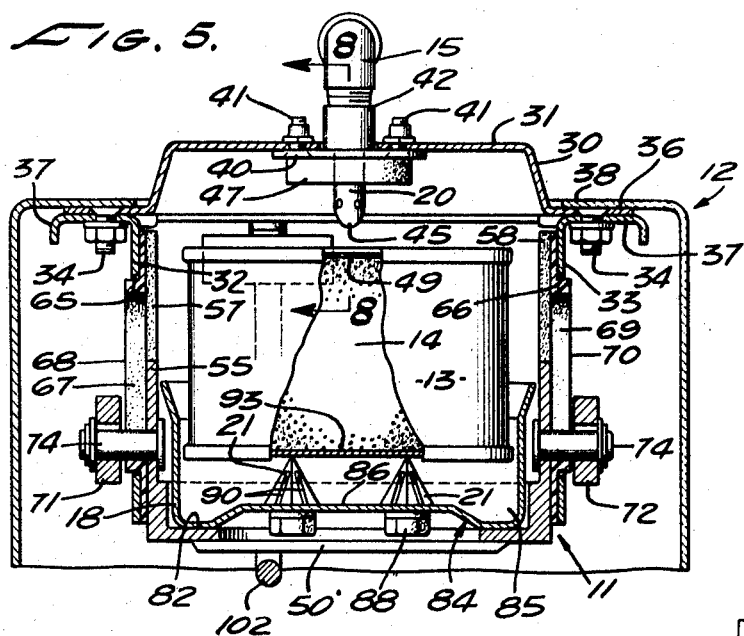
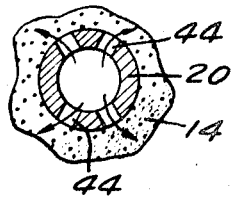
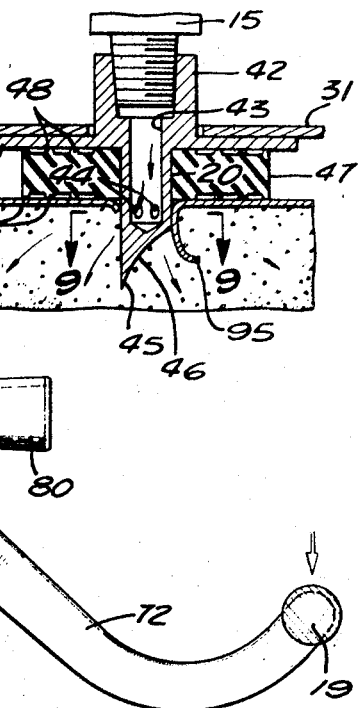
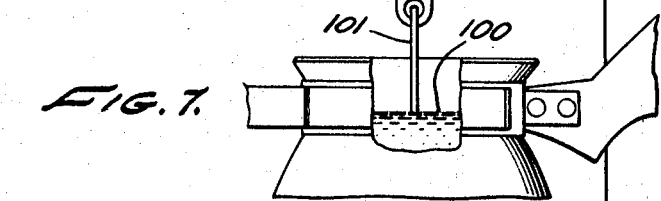
INVENTOR.
DAVID J. LEVINSON
BY *Beehler & Arant*
ATTORNEYS Oct. 7, 1969 D. J. LEVINSON 3,470,812
COFFEE BREWING HEAD
Filed March 18, 1968 5 Sheets-Sheet 4
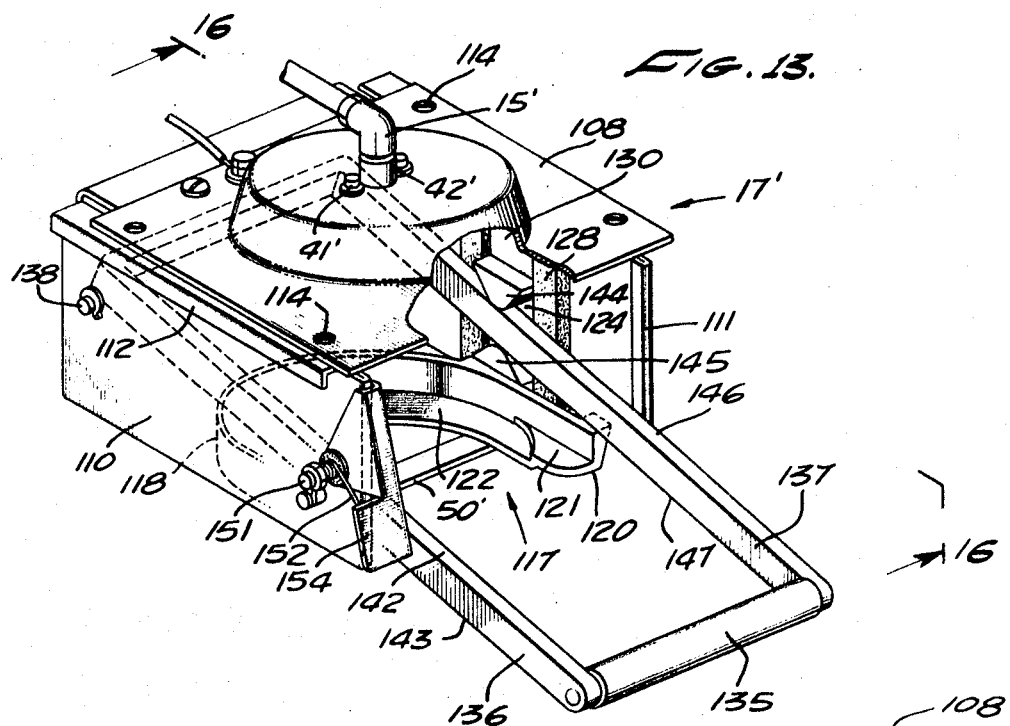
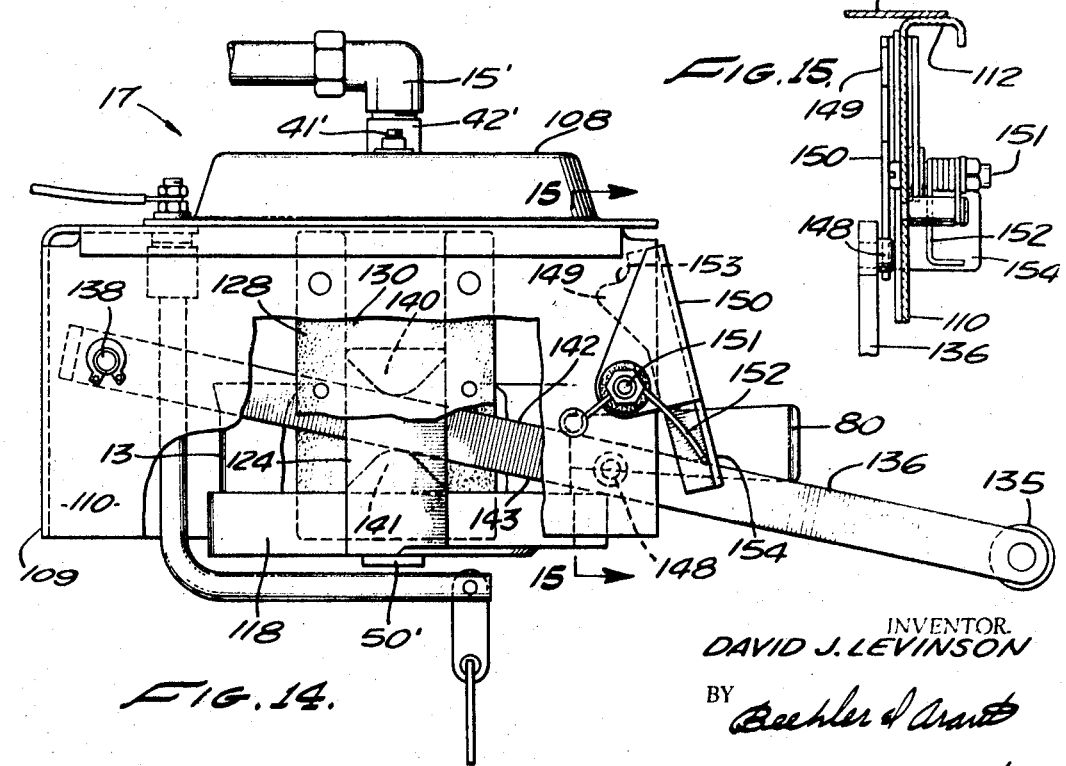
INVENTOR.
DAVID J. LEVINSON
BY Beehler & Arant
ATTORNEYS Oct. 7, 1969　　　D. J. LEVINSON　　　3,470,812
COFFEE BREWING HEAD
Filed March 18, 1968　　　　　　　　5 Sheets-Sheet
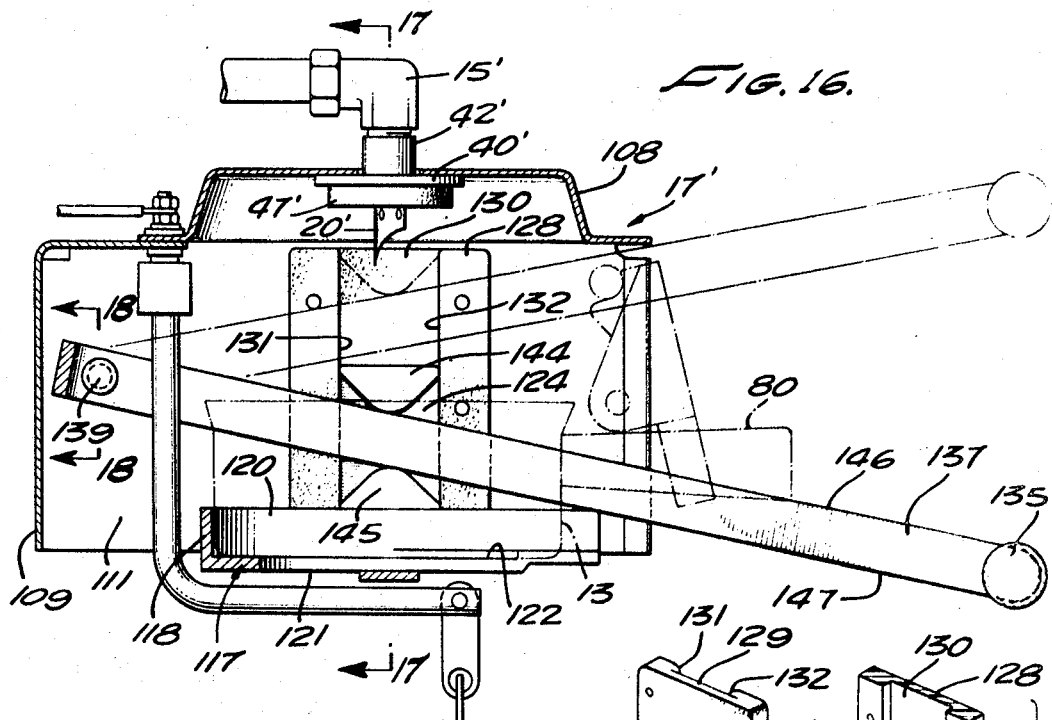
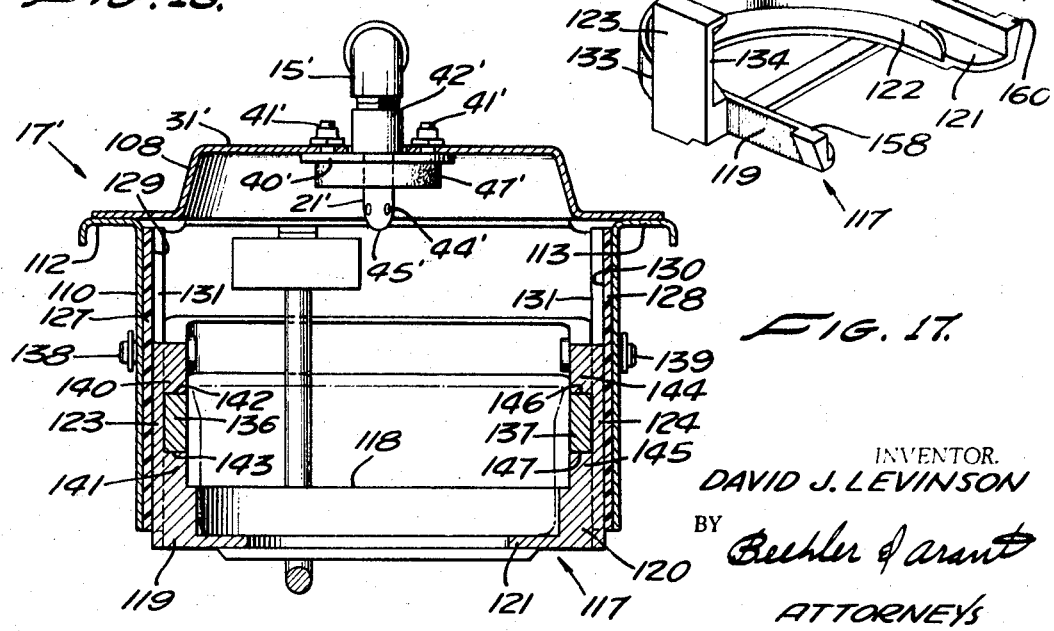
INVENTOR.
DAVID J. LEVINSON
BY
Bechler & Arant
ATTORNEYS United States Patent Office 3,470,812
Patented Oct. 7, 1969

3,470,812
COFFEE BREWING HEAD
David J. Levinson, 2521 N. Ontario St., Burbank, Calif. 91504
Filed Mar. 18, 1968, Ser. No. 713,637
Int. Cl. A47j 31/44; B67b 7/24
U.S. Cl. 99—295                12 Claims

ABSTRACT OF THE DISCLOSURE

The disclosure resides in what is commonly termed a coffee brewing head of the type frequently used in buffets installed on passenger airplanes. The disclosure comprehends a frame on which is mounted a vertically movable carriage which supports a sealed can of coffee grounds in a position such that the carriage can be moved vertically, moving with it the sealed can of coffee grounds until pointed projections puncture opposite ends of the can. When the puncturing has taken place, hot water is injected into the upper end saturating the grounds while they remain in the can and passing then as brewed liquid coffee through holes punctured in the lower end of the can, the brewed liquid coffee being collected temporarily in a container holder from which it is passed through a hole in the bottom to a conventional cruet or pouring pot. A handle on the container holder is used initially to insert the holder with the can into the brewing head and subsequently to remove it therefrom, so that it need not be handled while hot by bare hands. Shoes sliding in tracks on opposite sides guide the carriage during its longitudinal movement into and out of brewing position.

---

The invention herein disclosed is an improvement on applicant's prior application as disclosed in Patent No. 3,260,190 which is substantially representative of the prior art.

Although for some time fresh brewed coffee has been recognized as an extremely desirable way to serve coffee to passengers being transported from place to place, especially in airplanes, and further despite the fact that, as evidenced by the prior art, measured sealed quantities of coffee grounds made available in cans has been made use of as a highly desirable element in brewing heads already in operation, quicker and more dependably operating equipment which is lighter in weight and which needs less maintenance and servicing continues to represent a demand which has not been entirely fulfilled.

It is therefore among the objects of the invention to provide a new and improved coffee brewing head, the mechanical moving parts of which operate with improved ease and a minimum amount of friction, the moving parts being balanced and guided to the extent that the brewing head when operated can be quickly and conveniently used by persons of no more than modest skill and experience.

Another object of the invention is to provide a new and improved coffee brewing head which incorporates low friction guide slots for guiding a carriage into and out of container puncturing positions, wherein low friction material has been incorporated with other moving parts thereby to greatly improve the ease of operation without need for any lubrication.

Still another object of the invention is to provide a new and improved coffee brewing head in which is incorporated a convenient and handy container holder in which the container can be placed prior to insertion into the device, and wherein the holder becomes temporarily a part of the mechanism from which it is subsequently released and the holder then used to remove the can while the can is hot, without need for it being handled by bare hands.

Another object of the invention is to provide a new and improved coffee brewing head incorporating a carriage which is of simple open construction, readily adapted to the insertion thereinto of a container holder capable of being securely but releasably held in place, the container holder being provided with removable piercing projections so that the projections can be removed and replaced after a period of use without disturbing any other portions of the device.

Still another object of the invention is to provide a new and improved coffee brewing head which incorporates a manually actuated means for moving portions of the device which facilitate puncturing opposite ends of a coffee can, the movement being through a limited distance but provided with a sufficient amount of balanced smoothly operating leverage means so that the brewing operation can be accomplished with virtually a minimum amount of effort and expenditure of time.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIGURE 1 is a front perspective view of the device with removable parts shown in exploded position at locations adjacent to loading position.

FIGURE 2 is a fragmentary front elevational view of the device loaded and ready for operation.

FIGURE 3 is a fragmentary side elevational view taken on the line 3—3 of FIGURE 2, partially broken away.

FIGURE 4 is a fragmentary cross-sectional view on the line 4—4 of FIGURE 3.

FIGURE 5 is a fragmentary longitudinal sectional view on the line 5—5 of FIGURE 3.

FIGURE 6 is a perspective exploded view of moving and guiding parts of the device.

FIGURE 7 is a longitudinal sectional view similar to FIGURE 5 but showing the parts in the positions occupied while the brewing operation takes place.

FIGURE 8 is a fragmentary longitudinal sectional view on the line 8—8 of FIGURE 5.

FIGURE 9 is a fragmentary cross-sectional view taken on the line 9—9 of FIGURE 8.

FIGURE 10 is a fragmentary perspective view of one end of the container after being pierced.

FIGURE 11 is a fragmentary sectional view of the other end of the container after being pierced.

FIGURE 12 is a fragmentary cross-sectional view on the line 12—12 of FIGURE 11.

FIGURE 13 is a side perspective view of a second form of the invention.

FIGURE 14 is a side elevational view of the device of FIGURE 13 partially broken away.

FIGURE 15 is a fragmentary sectional view on the line 15—15 of FIGURE 14.

FIGURE 16 is a side elevational view.

FIGURE 17 is a longitudinal sectional view on the line 17—17 of FIGURE 16.

FIGURE 18 is a fragmentary sectional view on the line 18—18 of FIGURE 16.

FIGURE 19 is a fragmentary perspective exploded view of the carriage and block members in which it operates.

In an embodiment of the invention chosen for the purpose of illustration there is shown a coffee brewing head indicated generally by the reference character 10 surrounded by sundry elements of a frame 11. The frame is adapted to be appropriately mounted in a housing 12, which may be part of a brewer unit of some appropriate construction. The coffee brewing head is adapted to accommodate a container 13 in the form of a can containing a measured mass of coffee grounds 14, which, after hot water is passed through it from a hot water supply connection 15, is productive of brewed liquid coffee which is accumulated in a cruet or pouring pot 16 mounted underneath it during the brewing operation. Within the coffee brewing head is a carriage 17 upon which a container holder 18 may be placed, the carriage being manipulated by a handle 19 whereby to shift the container so that the upper end is punched by a sharp projection 20 and the lower end is punched by a series of substantially pyramidally shaped projections 21 so that liquid can flow through the can and then be collected in the container holder 18 from which it flows downwardly through a hole 22 in an outlet flange 23 to the pouring pot 16.

As shown in the drawings, the frame 11 contains sundry parts including a top wall 30 having an upwardly dished portion 31 and side wall sections 32 and 33, the side wall sections being fastened to the top wall by means of bolts 34. The frame additionally is secured in the housing 12 by bolts 35 which extend through appropriate flanges 36 of the top wall 30 and 37 of the side wall sections 32 and 33, whereby to suspend the coffee brewing head on strips 38 of the housing. A rear wall section 39 joins the two side wall sections 32 and 33 but the side opposite the rear wall section 39 is open.

In the chosen embodiment there is a plate 40 forming part of the dished portion 31 with a collar 42 projecting upwardly through the dished portion 31 where it is available for attachment with the connection 15. The projection 20 is carried by the plate 40 and, from an examination of FIGURE 8 it will be noted that there is a passage 43 through the collar 42 and projection 20, the passage terminating in a plurality of lateral outlets 44. The projection 20 terminates in a sharp point 45 at the end of a curved section 46. A resilient seal or washer 47 surrounds the projection 20 and is constructed of a series of concentric rings 48 on opposite faces so that those on the upper face of the seal 47 seal with respect to the plate 40 and those on the lower face seal with respect to an end 49 of the container 13.

The carriage 17 is shown to an additional good advantage in FIGURE 6 and consists of rear section 50 and two side sections 51 and 52. These sections form a relatively large area 53 which has one open side 54. A stiffening bar 50' may be provided for structural rigidity.

On opposite sides of the carriage 17 are slide shoes 55 and 56. To slidably accommodate the slide shoes 55 and 56 there are provided respective block members 57 and 58 which are preferably of some synthetic plastic resin material, as for example nylon, which has low friction surface characteristics, especially when in sliding engagement with a metallic member. The block members have on their inwardly facing side tracks 59 and 60, respectively, which have opposite edges 61 and 62 forming sliding surfaces. On the slide shoes 55 and 56 are also respectively opposite edges 63 and 64 which are designed to slidably engage the edges 61 and 62 when the device is in operation. The block member 57 is attached by appropriate securing means such as rivets to the side wall section 32 in a position overlying a large slot 65. Similarly, the block member 58 is fastened to the side wall section 33 over a relatively large slot 66. The block member 57 has a longitudinal slot 67 therein having side portions 68 projecting outwardly through the slot 65. A similar longitudinal slot 69 in the block member 58 has side portions 70 extending into the slot 66.

In order to move the carriage 17 longitudinally relative to the tracks 59 and 60, the handle 19 is manipulated. The handle is attached to opposite lever arms 71 and 72, the lever arms being pivotally mounted on the side wall sections 32 and 33, respectively, by means of pivot pins 73. Pivot pins 74 at inner ends of the levers 71, 72, respectively, extend through the respective longitudinal slots 67 and 69 into respective holes 75 and 76 of the slide shoes 55 and 56 to which they are attached. Although the lever arms 71 and 72 in the present embodiment are mounted as first class levers, it will be appreciated by merely making the lever arms longer and changing the location of the pivot pins 73 and 74 to a portion of an extended lever on the opposite side of the pivot pins 74 a second class lever would be provided which would operate in a reverse direction for raising and lowering the carriage 17.

As has been previously noted, the container 13 is adapted to be retained by the holder 18 which in turn is provided with a handle 80 extending horizontally from the side of the holder. The holder 18 in turn is made somewhat larger in inside diameter than the outside diameter of the container 13 and is provided with side walls having a flared upper edge 81 of such height that it could hold enough of the liquid coffee brew during the coffee making operation to avoid the need for a seal at the bottom and overflowing of the device. Also the hole 22 is of a size large enough so that it can easily pass all of the brewed liquid coffee faster than it can flow out of the can at the bottom, thereby to avoid overflow. A recess 82 in a horizontal strip 83 of the carriage is adapted to receive and to releasably retain the holder 18 so that it will not be inadvertently jarred out of place.

It will be noted further that a bottom structure 84 of the carriage has an upwardly dished configuration around the central portion providing a perimetral groove 85 which communicates with the hole 22. The projections 21 are mounted in the upwardly elevated portion 86 of the bottom structure 84. For convenience in mounting the projections 21 are provided with threaded studs 87 to which are applied self-sealing nuts 88, the nuts being preferably of some appropriate synthetic plastic resin material which will not be attacked by the liquid coffee or deteriorated by constant contact with hot water vapors. Along the sides of the projections 21 are recesses 90, tapered in depth, being shallower at the top and deeper at the bottom but of the same width throughout. They are also preferably smaller in cross-section than the average cross-sectional size of a particle of ground coffee, thereby to permit brewed liquid coffee to flow outwardly from the container 13 but retain the coffee grounds within the container.

In operation a container 13 is first placed in the holder 18 and the holder then placed on the carriage 17. The handle 19 is then raised which results in raising the carriage until a lock pin 91 on the lever 71 engages a spring catch 92 which locks the handle and carriage in uppermost position. The catch 92 pivots about a pin 92' and is normally urged to a latching position by a torsion spring 92". During the passage upwardly the projections 21 pierce a lower end 93. The projection 20 makes a hole 94 by shearing the metal and rolling back a tab 95 of the upper end 49. The projection 21 produce holes 96 by first piercing a small hole and then shearing the metal at the corners, causing the metal to hug the surface of the projection on all four sides as tabs 97 are rolled back.

When the handle and carriage are in the uppermost positions and there locked as described with the projections protruding into the interior of the container 13 a measured amount of hot water will, by means not shown, be passed through the connection 15 and the passage 43 and lateral outlets 44 into the interior of the container where the hot water comes into contact with a measured quantity of coffee grounds 14. The coffee grounds not only serve to give up the coffee for brewing purposes but also act in a sense as a filter in that all of the grounds remain in the can and only the liquid flows outwardly through the holes in the bottom and thence into the groove 85 within the holder 18 and out the hole 22 into the pouring pot 16. When the pouring pot has been filled to a level 100, liquid will engage a probe 101 at the end of an arm 102 which is mounted by appropriate means such as nuts 103 to a portion of the housing 12. An electric lead 104 is connected to the arm 102 and thence to a 24 volt D.C. current applied to the sensor probe and when the sensor probe 101 makes contact with any liquid 100, it de-energizes a brew solenoid (not shown) and shuts off the brewing circuit controlling a predetermined volume of liquid.

After a full quantity of coffee has been brewed in the manner described, a release tab 105 on the spring catch 92 is pressed whereby to release the lock pin 91 and permit the handle 19 and levers 71, 72 to be lowered, thereby to lower the carriage and permit withdrawal of the container 13 by manipulation of the holder 18 by its handle 80. This can be accomplished without removal of the pouring pot 16 from its position as shown in FIGURES 1, 2, 3, and 7. The coffee brewing head is then immediately ready for the next successive brewing operation.

In the form of device shown in FIGURES 13 through 19 there is employed a frame 17' here shown as consisting of a top wall 108, a rear wall 109, and side walls 110 and 111, the top wall 108 being attached to respective flanges 112 and 113 of side walls 110 and 111 by appropriate screws 114.

In this form as in the form first described, hot water is supplied through a connection 15' which is attached to a collar 42' of a plate 40' which is mounted upon a dished portion 31' of the top wall 108 by means of lock screws 41'. Extending downwardly from the plate 40' is a projection 21' terminating in a point 45' through which extend lateral outlets 44' for passing hot water into an appropriate can in accordance with the description given in detail with respect to the first described form of the invention. A seal 47' serves the same purpose as previously described seal 47.

In this form of device a carriage indicated generally by the reference character 17 is provided with a rear section 118 and side sections 119 and 120, there being additionally provided a horizontal strip 121 containing a recess 122 for reception of a container holder like the container holder 18 heretofore described.

On opposite sides of the carriage 117 are respective slide shoes 123 and 124. Cooperating with the slide shoe 123 is a block member 127 whereas a block member 128 is adapted to cooperate with the slide shoe 124. A track 129 is provided in the block member 127 and a similar track 130 is provided in the block member 128. The track 129 is defined in part by edges 131 and 132 as is also the track 130. Complementary edges 133 and 134 are found on respectively adjacent sides of the block members 127 and 128 and are adapted to slide longitudinally in respective tracks as the carriage 117 is moved up and down. As shown in the drawings, the block members are preferably of some appropriate synthetic plastic resin material and the slide shoes 123 and 124 are metallic. It will, however, be understood that this relationship is a matter of choice in that the relationship could be reversed by making the block members of metallic material and the slide shoes of synthetic plastic resin material.

For shifting the carriage in a longitudinal direction relative to the tracks in the block members, there is provided a handle 135 at the end of two lever arms 136 and 137. In this form of device the lever arms 136 and 137 are mounted inside of the side walls 110 and 111 to which they are pivotally attached at innermost ends by means of respective pivot pins 138 and 139, the lever arms being mounted in this manner as second class levers. The lever arm 136 extends between oppositely facing driven cams 140 and 141. In this arrangement respective upper and lower edge surfaces 142 and 143 in the lever arm 136 serve as drive cam surfaces. Similarly, the lever arm 137 extends between oppositely facing driven cams 144 and 145, respective upper and lower edges 146 and 147 of the lever arm 137 serving as drive cam surfaces.

In the second form of device, when in operation for shifting the carriage 117 up and down as it would be when provided with a container like the container 13 in an appropriate container holder like the container holder, the handle 135 is moved upwardly for shifting into a coffee brewing position. When the handle 135 is moved upwardly, the carriage 117 is moved upwardly. This is accomplished by the upper edges 143 and 146 of the respective lever arms 136 and 137 being cammed against the respective driven cams 144 and 145. Since the lever arms move in an arcuate path, their respective areas of contact with the driven cams slide or shift slightly inasmuch as the driven cams together with the block members of which they are part move in the respective tracks 129 and 130 in a well defined longitudinal direction, upwardly in the arrangement illustrated in FIGURES 13 through 19.

As the handle 135 reaches its uppermost position, a lock pin 148 cams a projection 149 out of the position shown in FIGURE 14 by tilting a spring catch 150 in a clockwise direction as viewed in FIGURE 14 about a pivot pin 151 against tension in a torsion spring 152. After the lock pin 148 has cleared the projection 149, the spring 152 will rotate the spring catch 150 in a counterclockwise direction to the position shown in FIGURE 14 in which the lock pin 148 will rest in a recess 153.

When the coffee brewing operation has been completed and it is desired to lower the carriage 117, the spring catch is released by finger pressure against a release tab 154 by means of which the spring catch is tilted sufficient to release the lock pin 148 and permit the handle to be lowered. If any force is needed to move the carriage 117 downwardly, this is applied by engagement of the respective lower edges 146 and 147 on the lever arms 136 and 137 against respective driven cams 144 and 145 thereby to force the carriage downwardly. This might be found needful in case there was resistance to disengagement of the can from the projection 20' or projections within the container holder of the type described in the first form of the invention.

Inasmuch as one aim of the invention has been to provide snug, well balanced sliding fits for moving parts where there is a substantial minimum amount of frictional resistance, without the need for lubrication, sliding surfaces which are provided are of unlike materials. Hence, if the block members 127, 128 are of synthetic plastic resin material, the sliding shoes 123 and 124 are of metallic material. In such event the driven cams are also metallic material, but inasmuch as there is relatively little movement between the driven cams and the edge surfaces of the lever arms, this can be a metal to metal sliding relationship. Should too much resistance be encountered, one or the other of the mutually sliding cam surfaces could be made of synthetic plastic resin material and the other of metallic material.

Further still, since it is advisable to provide a lower limit of movement for the carriage, stops 158 and 160 may be provided on the carriage against which the respective lever arms 136 and 137 can strike in the lowermost position, and inasmuch as the slide shoes in this position still remain in the respective tracks, the carriage will be prevented from moving any further in a downward direction.

While the invention has herein been shown and described in what is conceived to be a practical and effective embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A coffee brewing head assembly for brewing coffee from a sealed container having relatively stiff puncturable ends, said assembly comprising:

a frame including an upper supporting area, a sharp projection extending from said upper supporting area inwardly into said frame for puncturing one of said ends of the container, said projection having a passage therethrough for hot fresh water and a hot fresh water supply connection thereto, a carriage including a lower supporting area, one of said supporting areas having a movable mounting in said frame, said mounting comprising block members each having a longitudinally extending track, said block members being a part of the frame, slide shoe members on one of said supporting areas, there being a slide shoe member having a slidable mounting in each of said tracks, a station on the lower supporting area for engagement with a sealed container of coffee, means on said lower supporting area for piercing said other end of the container and catching brewed liquid coffee flowing from said container, and manually actuated means for moving said one of said supporting areas toward and away from the other supporting area, said manually actuated means comprising a lever, a pivotal connection between said lever and the frame, a handle on the lever extending from the frame, and a movable connection between said lever and said one supporting area, said one supporting area and said slide shoe members being movable longitudinally of said tracks in response to movement of said handle and said lever about the pivotal connection.

2. A coffee brewing head assembly as in claim 1 wherein said block members are of low friction synthetic plastic resin material.

3. A coffee brewing head assembly as in claim 1 wherein there are side walls on said frame to which said block members are mounted, said side walls and said block members having mutually aligned slots therein and a connection from the lever extending through the aligned slots into engagement with the carriage.

4. A coffee brewing head assembly as in claim 3 wherein side portions of the slots of said block members extend through the slots in the side walls.

5. A coffee brewing head assembly as in claim 1 wherein said carriage comprises a perimetral rim for providing said station, said rim being open on the side thereof facing outwardly of the frame.

6. A coffee brewing head assembly as in claim 1 wherein said means on the carriage for piercing the adjacent end of the container comprises a container holder into which said container is adapted to be inserted, a handle on said holder, and a bottom structure on the holder having end piercing means thereon and a passage therethrough for brewed liquid coffee.

7. A coffee brewing head as in claim 1 wherein said piercing means comprise a plurality of pointed and longitudinally apertured projections, said projections having mounting studs extending through the bottom structure and releasable fastening means on said studs for holding said projections in place.

8. A coffee brewing head as in claim 6 wherein there is a recess in the carriage for reception of said container holder.

9. A coffee brewing head as in claim 1 wherein said movable connection between the lever and the slide shoe members is a sliding connection and comprises a drive cam means on the slide shoe members and respective drive cam means on the lever.

10. A coffee brewing head as in claim 9 wherein one of said members is of synthetic plastic resin material and the other of said members is a metallic material.

11. A coffee brewing head assembly for brewing coffee from a sealed container having relatively stiff puncturable ends, said assembly comprising:
a frame including an end wall, a sharp projection extending from said end wall inwardly into said frame for puncturing one of said ends of the container, said projection having a passage therethrough for hot fresh water and a hot fresh water supply connection thereto, a carriage having a movable mounting in said frame, said mounting comprising block members each having a longitudinally extending track, said block members being a part of the frame, slide shoe members on the carriage, there being a slide shoe member having a slidable mounting in each of said tracks, a station on said carriage for reception of a sealed container of coffee, means on said carriage for piercing said other end of the container and catching brewed liquid coffee flowing from said container, and manually actuated means for moving said carriage toward and away from said projection, said manually actuated means comprising a lever, a pivotal connection between said lever and the frame, a handle on the lever extending from the frame, and a movable connection between said lever and said carriage, said carriage and said slide shoe members being movable longitudinally of said tracks in response to movement of said handle and said lever about the pivotal connection.

12. A coffee brewing head as in claim 11 wherein said piercing means comprises a plurality of pointed and longitudinally apertured projections, said projections having mounting studs extending through the bottom structure and releasable fastening means on said studs for holding said projections in place.

References Cited

UNITED STATES PATENTS

| | | | |
|---|---|---|---|
| 2,899,106 | 8/1959 | Weinert | 99—295 |
| 2,939,381 | 6/1960 | McBride | 99—289 |
| 3,260,190 | 7/1966 | Levinson | 99—295 |
| 3,403,617 | 10/1968 | Lampe | 99—295 |

ROBERT W. JENKINS, Primary Examiner